(12) United States Patent
Staton et al.

(10) Patent No.: US 7,194,658 B2
(45) Date of Patent: Mar. 20, 2007

(54) VARIOUS METHODS AND APPARATUSES FOR INTERFACING OF A PROTOCOL MONITOR TO PROTOCOL CHECKERS AND FUNCTIONAL CHECKERS

(75) Inventors: Terrence Anthony Staton, Mountain View, CA (US); Herve Jacques Alexanian, San Jose, CA (US); Jeffrey Allen Ebert, Half Moon Bay, CA (US)

(73) Assignee: Sonics, Inc., Mountain View, CA (US)

( * ) Notice: Subject to any disclaimer, the term of this patent is extended or adjusted under 35 U.S.C. 154(b) by 612 days.

(21) Appl. No.: 10/627,333

(22) Filed: Jul. 24, 2003

(65) Prior Publication Data

US 2005/0021305 A1    Jan. 27, 2005

(51) Int. Cl.
  *G06F 11/00*  (2006.01)
(52) U.S. Cl. ............... 714/31; 714/741; 703/15
(58) Field of Classification Search ......... 714/741
  See application file for complete search history.

(56) References Cited

U.S. PATENT DOCUMENTS

| | | | |
|---|---|---|---|
| 5,948,089 A | 9/1999 | Wingard et al. | |
| 6,182,183 B1 | 1/2001 | Wingard et al. | |
| 6,263,302 B1 * | 7/2001 | Hellestrand et al. | 703/17 |
| 6,292,765 B1 * | 9/2001 | Ho et al. | 703/14 |
| 6,298,452 B1 * | 10/2001 | Hill | 714/28 |
| 6,678,645 B1 * | 1/2004 | Rajsuman et al. | 703/20 |
| 6,918,058 B2 * | 7/2005 | Miura et al. | 714/30 |
| 2002/0138814 A1 * | 9/2002 | Katayama | 716/5 |

OTHER PUBLICATIONS

Microsoft Press Computer Dictionary Third Edition, "object-oriented", Microsoft Press, 1997, p. 337.*

Heinkel et al., "An Approach for a Dynamic Generation/Validation System for the Functional Simulation Considering Timing Constraints", 1996 IEEE.*
Chauhan et al. "Verifying IP-Core based System-on-Chip Designs", 1999 IEEE.*
Abhik Roychoudhury et al., "Using formal techniques to Debug the AMBA System-on-Chip Bus Protocol", School of Computing National University of Singapore, Singapore 117543, {abhik, tulika, karrisid}@ comp.nus.edu.sq, prior to filing date of this application, pp. 6 total.
Sonics™ SMART IP for Greater SOC Complexity Faster, Synapse 3220, "Synapse 3220™ SMART Interconnect IP™", www.sonicsinc.com/sonics/products/synapse 3220, May 30, 2003, pp. 1-2.
Thomas Anderson, Co-Chair, VSIA Functional Verification DWG, "Verification Reuse for Embedded Virtual Components", 0-IN Design Automation, VSI Alliance™, Mar. 4, 2002, pp. 1-23.
Tom Anderson, VP of Applications Engineering 0-In Design Automation, Inc., Co-Chair, VSIA Functional Verification DWG, tla@0-in.com, "Verification: Reuse It or Lose It", 0-IN Design Automation, DesignCon 2002, pp. 1-48.
"Open Core Protocol Specification," OCP International Partnership, Release 1.0, 2001.

* cited by examiner

*Primary Examiner*—Gabriel L. Chu
(74) *Attorney, Agent, or Firm*—Blakely, Sokoloff, Taylor & Zafman LLP

(57) ABSTRACT

Various methods and apparatuses are described in which a software programming interface connects one or more functional checker components and one or more protocol checker components to an interconnect monitor component. A computer readable medium stores code for the one or more functional checker components for Intellectual Property (IP) cores, one or more protocol checker components, the interconnect monitor component, and the software programming interface. The monitor component has code to build data structures containing protocol data types requested by a checker component and code on where to deliver data based upon a particular type of data requested by the checker component.

45 Claims, 3 Drawing Sheets

VARIOUS METHODS AND APPARATUSES FOR INTERFACING OF A PROTOCOL MONITOR TO PROTOCOL CHECKERS AND FUNCTIONAL CHECKERS

NOTICE OF COPYRIGHT

A portion of the disclosure of this patent document contains material that is subject to copyright protection. The copyright owner has no objection to the facsimile reproduction by anyone of the text and drawings, as they appear in the Patent and Trademark Office Patent file or records, but otherwise reserves all copyright rights whatsoever.

BACKGROUND OF THE INVENTION

The Intellectual Property (IP) cores may be circuitry, embedded memories, communication links, a processor, etc., having self-contained designed functionality. Additionally, IP cores may be implemented in a variety of ways, and may be fabricated on a single integrated circuit such as a System on a Chip.

Various interconnect protocols exist such as Open Core Protocol™ (OCP), Peripheral Component Interconnect, Media Independent Interface, and Advanced High-performance Bus (AHB). Some interconnect protocols define a bus-independent interface for IP cores. System-on-a-Chip IP core interfaces can be described in this consistent format, such as a simple peripheral core, a high-performance microprocessor, or even an on-chip communication subsystem. Unique for each core, the IP core interface includes all of the signals required to describe IP core communication including data flow, control, and verification and test signals. An IP core interface assists system verification and testing by providing a firm boundary around each IP core that can be observed, controlled, and validated.

System on Chip (SoC) designs use bus protocols for high performance data transfer among the Intellectual Property cores located on that chip. These interconnect protocols may incorporate advanced features such as pipelining, burst and split transfers, etc. Many of the modules connected to the bus are vendor provided IP cores in which the designs for these IP cores may not be made available. The SoC bus protocol between these IP cores as well as the functionality provided by each IP core needs to be debugged and have various design values verified.

An approach to verifying digital hardware during a simulation run may be to utilize software monitors and software checkers written in C++. The monitor serves the purpose of collecting data from a hardware interconnect and making it available to a checker. An interconnect can be a set of wires that carries data and control information between two IP cores. The checker may model the functionality of an IP core using the data from the monitors as input. The checker communicates to the monitor that it needs data and establishes a single location to send that data. These monitors collect data from a hardware interconnect that is attached to the IP core. The checker compares the expected results of the IP core it is modeling to the actual data by using the data collected through the same monitors. Typically, a monitor exists for each of the interfaces of an IP core. The data collected from each of these monitors is passed to the checker for that specific IP core. A monitor may also be located inside or external to an IP core.

This typical approach quickly becomes problematic in hardware designs where several IP cores are connected via hardware interconnects. A monitor on each interconnect could potentially have to provide various items of data to several checkers. For instance, a monitor might need to provide data to a master core checker, a slave core checker and a protocol checker all at the same time. The typical approach is that a monitor does not share data required by several checkers. Each checker has its own monitor to retrieve the needed data.

Further, the typical approach may have protocol monitors write protocol data to a file during a simulation run. After a simulation run completes, then a series of tools run to analyze the data contained in the trace files to detect errors and display performance data. This process lacks the ability to check for errors in a design during a simulation run. It may be desirable to terminate a simulation a few clock cycles after an error occurs in a hardware design in order to decreases costs both in terms of required CPU time and time between successive simulation runs.

SUMMARY OF THE INVENTION

Various methods and apparatuses are described in which a software programming interface connects one or more functional checker components and one or more protocol checker components to an interconnect monitor component. A computer readable medium stores code for the one or more functional checker components for Intellectual Property cores, one or more protocol checker components, the interconnect monitor component, and the software programming interface. The monitor component has code to build data structures containing protocol data types requested by a checker component and code on where to deliver data based upon a particular type of data requested by the checker component.

BRIEF DESCRIPTION OF THE DRAWINGS

The drawings refer to embodiments of the invention in which.

Figure 1:
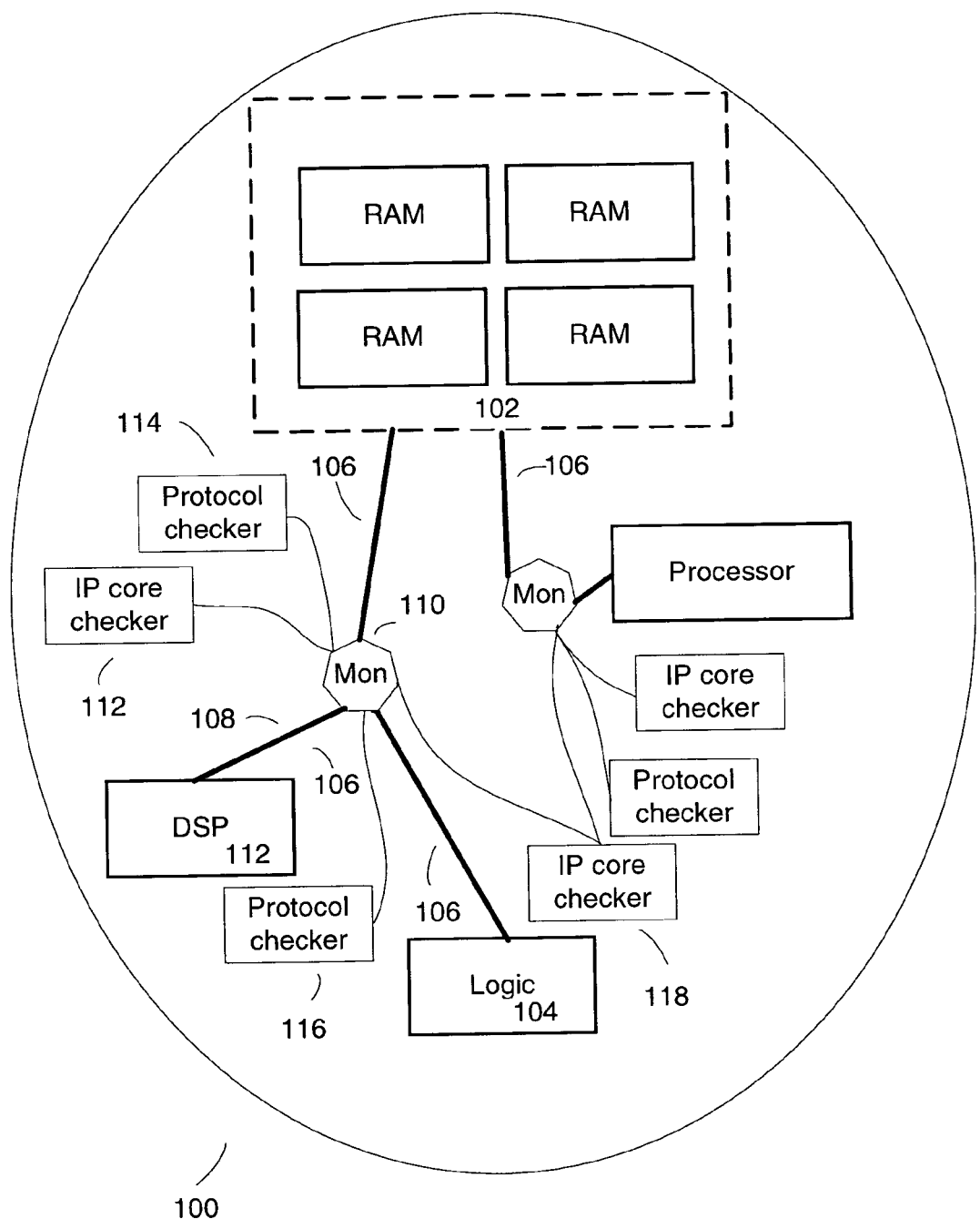
FIG. 1 illustrates a block diagram of an embodiment of one or more interconnect monitor components, one or more functional checkers components for Intellectual Property (IP) cores, and one or more protocol checker components using a programming interface to cooperate to verify and debug an IP core design.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, computer programming languages, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Further, specific numeric references such as first protocol checker component, may be made. However, the specific numeric reference should not be interpreted as a literal sequential order but rather interpreted that the first protocol checker component is different than a second protocol checker component. Thus, the specific details set forth are merely exemplary. The specific details may be varied from and still be contemplated to be within the spirit and scope of the present invention.

In general, various methods and apparatus are described in which a software programming interface connects one or more functional checker components and one or more protocol checker components to an interconnect monitor component. A computer readable medium stores code for the one or more functional checker components for Intellectual Property (IP) cores, one or more protocol checker components, the interconnect monitor component, and the software programming interface. The monitor component has code to build data structures containing protocol data types requested by a checker component and code on where to deliver data based upon a particular type of data requested by the checker component. The monitor component has code to create protocol data objects that tracks within the protocol data object whether the data is still being used by another checker component and when the protocol data object should be deleted. The monitor component calls methods defined in the code of the checker component as data becomes available during the simulation run to allow an error to be detected as soon as possible during the simulation run.

FIG. 1 illustrates a block diagram of an embodiment of one or more interconnect monitor components, one or more functional checker components for Intellectual Property (IP) cores, and one or more protocol checker components using a programming interface to cooperate to verify and debug an IP core design or a collection of such cores in a system. Several IP cores, such as RAM 102, Logic 104, etc. on a System on a Chip 100 may be connected via various hardware interconnects 106. A hardware interconnect such as a first hardware interconnect 108 may be a set of wires that connects two or more hardware IP cores together. A software monitor component, such as the first monitor component 110, is programmed to collect data from a hardware interconnect that is attached to an IP core, such as the Digital Signal Processor 112. The software monitor component makes the monitored data available to a checker component. A functional checker component for an IP core, such as the first IP core checker 112, models the functionality of an IP core using the data from the monitor component as input. A protocol checker generation component determines the type of protocol interconnect that is being used. The protocol checker generation software component may be used to loop through all the hardware interconnects in the design and to create an instance of an appropriate protocol checker for that connection, such as the first protocol checker 114. For functional checkers, a product specific code separate from the monitors and protocol checkers may loops through all the cores and spawn instances of functional checkers for them. The actual checks between the protocol checker component and the monitor component may be determined by the protocol itself. For example, a data handshake-phase starting on a thread that has no previous corresponding request phase on the same thread is an unrecoverable error for an OCP software monitor. Two or more checker components may be used when verifying the same configurable interconnect protocol, such as OCP, through the same monitor component. The monitor component supplies data to these two or more checker components. For example, the first monitor 110 supplies data to the first functional checker component for an IP core 112, the first protocol checker component, and a second protocol checker component 116. A well-defined programming interface exists for the multiple software checker components per software monitor component. A checker component, such as a protocol checker, functional checker, system checker, or similar checker uses the modeled protocol data for input stimulus and output verification. The functional checker component detects errors in an IP core design and communicates those errors to a user during a simulation run.

The software programming interface connects one or more functional checker components for IP cores, such as the first functional checker component 112 and a second functional checker component 118, and one or more protocol checker components, such as a first protocol checker component 114 and a second protocol checker component 116, to a single interconnect monitor component such as the first monitor component 110. The software programming interface enables a checker component to request callback services for specific items of data provided by the interconnect monitor. The interconnect monitor invokes a routine by calling methods defined in the code of the checker components as data becomes available during the simulation. Each item of data passed to the checker components may be self-maintaining and deletes itself once all of the checker components are no longer referencing that item of data. The software programming interface enables a clear separation of code between the interconnect monitors and checker components receiving data from that interconnect monitor.

One or more computer readable mediums, such as memories, may store the code for the one or more interconnect monitor components, the one or more functional checker components for IP cores, the one or more protocol checker components, and the software programming interface. A checker component may be modeled to represent the functional checker of an IP core, a protocol checker, a higher level construct modeled to debug an IP core design, or other type of checker. The software interface between the monitor component and checker component does not impose any restrictions on the type of checker component that can be constructed. Implementing a checker component to model functionality of an IP core for debug purposes may use the software interface to a monitor in the same manner as a protocol checker or any other type of checker. The one or more interconnect monitor components, one or more functional checker components for IP core components, and one or more protocol checker components cooperate to verify and debug an IP core design and its interactions with other IP cores.

The software programming interface, protocol checker components, functional checker components, and interconnect monitor component may be coded in an object-oriented programming language, such as Java, C++, Smalltalk, object-oriented versions of Pascal, or other similar language.

Note, another programming language may be used to create the software programming interface, protocol checker components, functional checker components, and interconnect monitor component, although the features found in object-oriented languages will be used for describing an embodiment of this invention.

The interconnect monitor component has code to build object oriented data structures containing protocol data types requested by the checker component. For example, the first interconnect monitor component 110 has code to build object oriented data structures containing protocol data types requested by the first protocol checker component 114 and the first functional checker component for an IP core 112. The interconnect monitor component has code that determines where to deliver the collected data based upon the particular type of data requested by the checker component. The software interface component defines both the data type of a data structure and the types of operations, such as functions, that can be applied to the data structure. In this way, the data structure becomes an object that includes both data and functions that are specific to the protocol being modeled. The software interface includes a set of base classes for the data structures. The monitor component builds data structures from the data types defined in the software interface component for all types of objects, checkers, etc., that have registered with the monitor and that need protocol data from the monitor interconnect component. The monitor component may create data structures placed into shared pointers, which are then passed from the monitor component to pass data from a single monitor component to one or more checker components. One shared pointer could be passed to several objects such as checker components. The monitor component may have code to create protocol data objects that are instances of the data structure from the software interface component. The protocol data object tracks within itself whether the data is still being used by another checker component and when the protocol data object should be deleted via a reference counted pointer. Thus, the data is self-maintaining because the data object deletes itself when the last checker component referencing the data object no longer needs that data.

The software interface component also includes a set of base classes to assist the monitor component in implementing callback services. The set of base classes of the programming interface allows implementation across two or more types of interconnect protocols. The set of base classes of the software interface can be used by multiple monitor component implementations, one for each interconnect protocol to be supported.

The monitor component may contain a template abstraction sensitive to the particular data type being requested by the checker component when that checker component registers a data callback service with the monitor component. The particular data types supported by a monitor component may be based on the protocol of the hardware interconnect being monitored. The monitor component calls method(s) defined in the code of the checker component(s) as data becomes available during the simulation run to allow an error to be detected during a simulation run.

When first initialized, a protocol checker component retrieves the instance of the monitor that will create data structures for the protocol of the hardware interconnect the checker has been assigned. A checker component, such as the first protocol checker 114, directs the monitor component at the start of a simulation run on the type of data requested and the one or more locations to send that data in order to verify the hardware interconnect. The checker directs the monitor on the type of data requested and the monitor reports an exception if that type of data is not available for that particular protocol interconnect. A checker component may also register and unregister callback services at anytime during a simulation run. Utilities other than checkers such as performance analyzers might also use this feature.

The monitor contains code to obtain protocol data in an object-oriented form and then relays that protocol data to several checker components or even several locations within a single checker component. The monitor relays that information using an object-oriented call, such as calling a dereferenced pointer to a method, to send the data to the checker component specified locations. The monitor may use the pointer to the method sent from the checker component to identify the data type that was requested as well as the location to which the data with that type should be delivered. For example, two instances of the protocol data may be created to send a particular data type to two different locations in the same checker component. Each checker instance sends that particular data type to a separate location. Also, one data item may go to two or more locations and each location is within a different checker component.

The monitor component supplies callback services that are sensitive to the particular data type requested by a checker component. The checker component provides unique delivery locations for each requested data type to the monitor component. The checker component provides the particular data types requested from the monitor to the monitor component at the time of registration for that data. The software interface cooperates with code in a hardware interconnect monitor to enable a checker component to request callback services for specific items of data provided by one or more hardware interconnect monitors.

Once the data is accessible, the monitor knows where to deliver the data based on the type of data. Note, for more complex data types it may take many cycles of data collection to make one data object available. The types of data depend on the particular interconnect protocol supported by the monitor. The data types may be defined in the software interface. Data types vary within a single protocol as well as data types vary in different protocols. One software interface may be defined for each interconnect protocol. For example, OCP interconnect protocol types of data may be request phase data, burst transaction data, etc. Advanced High-performance Bus (AHB) interconnect protocol, types of data may be transfer data, burst transaction data, etc. The monitor component communicates the value of the data as the data becomes available. The monitor also communicates the time when the data became available such as in synchronization clock cycles, edge sensitive data events both positive and negative, simulation time typically in nanosecond, or some other similar indication of when the data became available.

Figure 2:
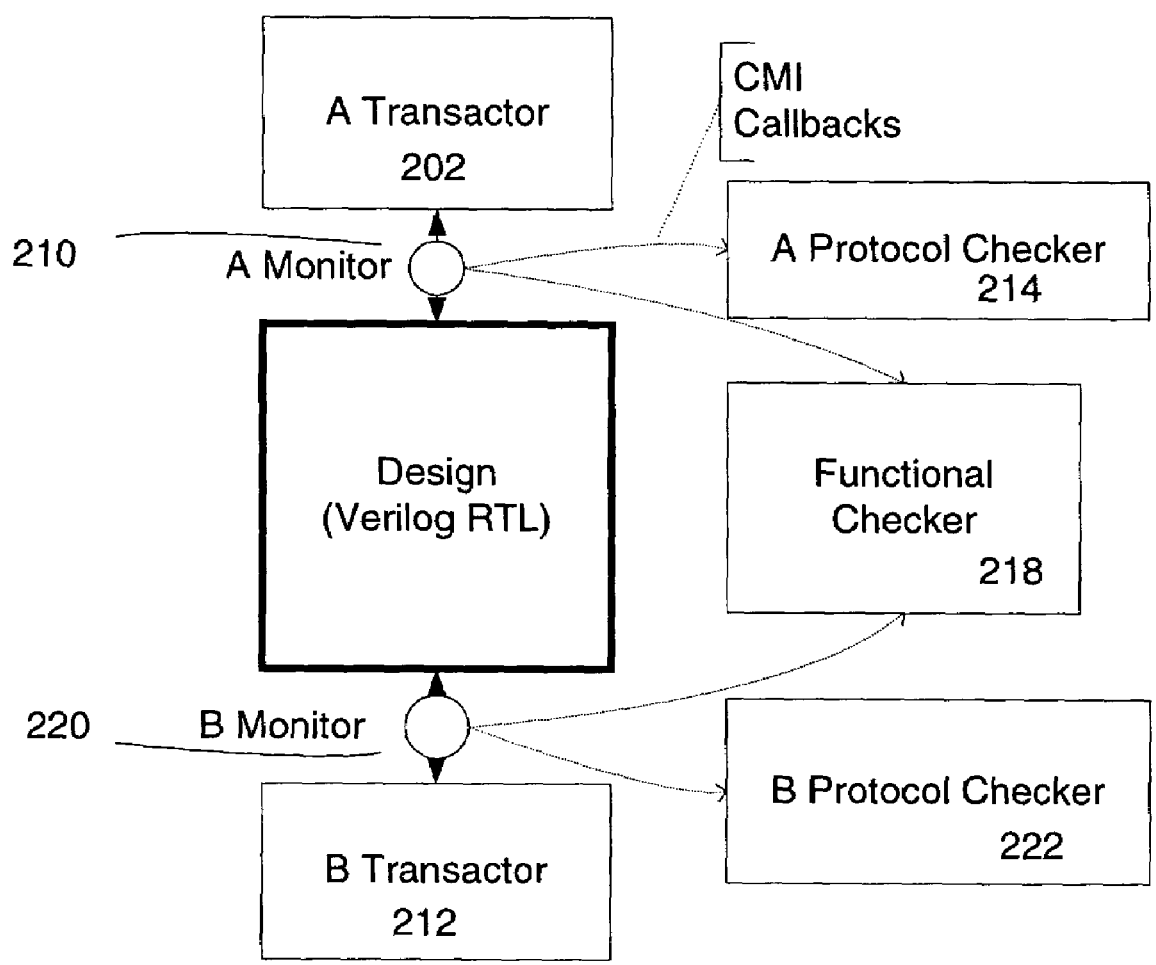
FIG. 2 illustrates a block diagram of an embodiment of one or more interconnect monitor components, one or more functional checkers components for Intellectual Property (IP) cores, and one or more protocol checker components using a well-defined programming interface to allow an error to be detected during a simulation run.

FIG. 2 illustrates a block diagram of an embodiment of one or more interconnect monitor components, one or more functional checkers components for Intellectual Property (IP) cores, and one or more protocol checker components using a well-defined programming interface to allow an error to be detected during a simulation run. Two monitor components, a first monitor component 210 and a second monitor component 220, provide protocol data to three checker components, 214, 218, 222. The first monitor component 210 provides data to the first protocol checker component 214 and the first functional checker component 218. The second monitor component 220 provides data to the second protocol checker component 222 and the first functional checker component 218.

The programming interface allows code separation between checkers and monitors to remain separate and create the required flexibility in solving an undetermined problem space. The programming interface may be a language and message format used by the application program to communicate with the communications protocol. The programming interface may be implemented by writing function calls in the program, which provide the linkage to the required subroutine for execution such as callback services and data passing structures. The combination of data passed in well-defined structure and data callback services enables clear and distinct separation between the checker code and the monitor code. The programming interface between the monitors and checker components allows significant gains in verification efficiency.

The data passing structure and call back services may be implemented in C++.

The data passed from the monitor components to the several checker components may have a well-defined structure. Monitors collect protocol data into data structures that use shared-pointers for use by checkers. The term data structure may refer to a scheme for organizing related pieces of information. The basic types of data structures may include: files, lists, arrays, records, trees, tables, etc. In particular, C++ shared-pointers may be particularly useful for passing the data from a single monitor component to several checker components. By using shared-pointers, neither the monitor component nor checker components needs to track data usage by all checkers that receive the data.

A monitor component may only generate data structures as needed to supply data to the checker components. The sum total of requests for data by the checker components to that monitor component is not a maximal set of data types that can be provided by the first monitor component. Thus, the monitor component may be configured to produce only the data structures requested by the checker components at registration, rather than producing every potential data structure that has a possibility of being requested by a checker component in a simulation run. This allows the monitor to perform more efficiently when a small subset of data types is requested by the checker components.

Checker components selectively register callback services to the monitor components for the protocol data that the checker component requests in performing its checks. The checker component may request data callback services of a monitor component via a C++ template abstraction that is sensitive to the data type being requested by that checker component.

The data structures used by the programming interface can be defined for each hardware interconnect protocol that is supported. Either a maximal or minimal subset of a protocol can be used when defining the data structures. The use of a maximal or minimal subset depends upon the requirements of what protocol data is to be passed between the checkers and a monitor. For most interconnect protocols, a minimal subset may consist of a signal.

An example of a signal data structure created by an example monitor component can be summarized with the following example protocol.

```
class Cmd : public SignalT {
    const double & getTime( ) { return m__dtime; }
    const int & getCycle( ) { return m__ncycle; }
private:
    double m__dtime;
    int m__ncycle;
};
```

The data structure contains the time at which the Cmd data was captured. This may be particularly useful to checker components as it can work with "snap-shots" of data instead of continually having to store state.

In the example protocol, a higher-level construct of data structures may be defined using the lower level data constructs. For example, a command group may be summarized with the following:

```
class CmdGroup {
public:
    const double & getTime( );
    const int & getCycle( );
    SharedPointerT<Cmd> m__hCmd;
    SharedPointerT<Data> m__hData;
    SharedPointerT<Accept> m__hAccept;
};
```

The higher-level constructs may use shared-pointers. The use of shared-pointers eliminates the complex need of determining exactly when data is no longer needed either directly by a checker or through a higher-level data construct still in use by a checker. For example, if a checker has a CmdGroup data object then Cmd, Data and Accept data object referenced by that CmdGroup must be valid while the CmdGroup is in use. Alternatively, other ways are possible to eliminate no longer useful code such as storing data usage into a linked list or array with an algorithm that will scan the data usage structure for elements that are no longer need.

In the example protocol, an even higher-level construct may be summarized with the following.

```
class Request {
public:
    const double & getStartTime( ) { return m__dstartTime; }
    const double & getEndTime( ) { return m__dendTime; }
    const int & getStartCycle( ) { return m__nstartCycle; }
    const int & getEndCycle( ) { return m__nendCycle; }
    const bool & isComplete( ) { return m__bisComplete; }
    SharedPointerT<CmdGroup> m__hcmdGroup;
private:
    double m__dstartTime;
    double m__dendTime;
    int m__nstartCycle;
    int m__nendCycle;
    bool m__bisComplete;
};
```

The Request class allows a command to take more than one cycle to process. Thus, a check exists to detect when the command has completed. The Request class can then be used in even higher-level constructs of this example protocol. The members of each class and procedures executed when an object receives a message, such as a method, of each class are tailored to the needs of a checker component.

Checker implementation time may be reduced by making access to the received data easier. The data structures created for the interface may have their usage optimized to the needs of the checker components.

An example process by which a checker requests data callback services of a monitor may use a C++ template abstraction, which is sensitive to the data type being requested by the checker. Through the process of abstraction, a verification engineer hides all but the relevant data about an object in order to reduce complexity and increase efficiency. With an abstraction, the object that remains is a representation of the original, with unwanted detail omitted. The resulting object itself can be referred to as an abstraction, meaning a named entity made up of selected attributes and behavior specific to a particular usage of the originating entity.

The checker component supplies several methods, one per data type to be requested, to a monitor component that will later be called back when specific data for that method is created by the monitor. For example, a checker component might have the following method that uses a data type from the above example protocol.

void           Checker::requestCallback
    (SharedPointerT<Request>hrequest) { }

A pointer to this method along with a reference to the class instance can be sent to a monitor component via a registration method. A pointer to this particular method have the following type in C++.

void (Checker::*)(SharedPointerT<Request>)

The monitor component passes a value, such as an argument, between programs, subroutines or functions. The monitor can use the argument type of the pointer to the method to handle data abstraction for the callback services. A template method to register a callback with a monitor may be summarized with the following prototype.

```
template<class checkerObjT, typename callbackArgT>
void registerCallback(
checkerObjT & checkerObj,
void (checkerObjT::*pcallbackMethod)( callbackArgT);
```

Through callbackArgT in the above method the monitor can then use a variety of data abstraction approaches to handle the collection and processing of these callbacks to the checkers. Data abstractions of these callback methods include the following four examples:

1) Create a STL map container in the monitor keyed to typeid(callbackArgT) with the contents of a defined class which contains both a pointer to a checkerObjT and pointer to a method of type void (checkerObjT::*)(callbackArgT). The monitor completely contains the class objects that hold the pointer to the method and the pointer to the class containing the method. Methods registered with a callbackArgT that are not supported by the monitor may be detected at runtime.

2) Create a class that hides type information through the use of a static method that takes two arguments: a void pointer and a callbackArgT. The class may contain both a pointer to the checker object and a pointer to the callback method. The void pointer inside the static method is static_cast to the class's type. This pointer is then used to call the callback method using the * operator on the checker pointer and the method pointer data members. Methods registered with a callbackArgT that are not supported by the monitor may be detected at compile time.

3) Use an extra argument in the callback registration to identify the data type. An enumeration can be constructed to represent each data type. The monitor can key callbacks to checkers using the enumerated data.

4) Use a common base class across all protocol data objects. This inherited base class could be used to hide the data types of the derived protocol data objects when processing the callbacks.

5) It is possible to mix some of the above four approaches together to achieve a slight variation. For example, approaches 1 and 3 or 1 and 4 can be combined to avoid the usage of the typeinfo library. These approaches are merely examples and many more may be implemented.

Allowing the checkers to remain separate from the monitor creates the required flexibility in solving an undetermined problem space. When several designs are all interconnected to each other using a varying range of protocols in a user specified configuration then flexibility is of prime importance. The separation allows maximal code reuse across any conceivable problem space. Common base code for the monitor component and the checker components may be written to facilitate reuse of the code across two or more types of interconnect protocols each utilizing different protocols.

A greater portion of the verification software, the monitor, and protocol interface code, is reused across several design projects. When a new previously unimplemented protocol is encountered an existing set of base classes for the data structures and monitor callback services enables quick development of monitors and checkers.

Monitor components may take the responsibility of collecting high-level protocol data objects so that verification engineers do not have to write similar code to handle high level protocol constructs across different checker components. The verification engineer writing checkers may focus on modeling rather than the protocols of the hardware interconnects. Verification engineers may debug one protocol monitor for each interconnect protocol to lessen the debug time of the verification software.

In an embodiment, a machine-readable medium may have stored thereon information representing the apparatuses and/or methods described herein. A machine-readable medium includes any mechanism that provides (e.g., stores) information in a form readable by a machine (e.g., a computer). For example, a machine-readable medium includes read only memory (ROM); random access memory (RAM); magnetic disk storage media; optical storage media; flash memory devices; DVD's, digital signals, EPROMs, BEPROMs, FLASH, magnetic or optical cards, or any type of media suitable for storing electronic instructions. Slower mediums could be cached to a faster, more practical, medium. The information representing the apparatuses and/or methods stored on the machine-readable medium may be used in the process of creating the apparatuses and/or methods described herein. For example, the information representing the apparatuses and/or methods may be contained in an Instance, soft instructions in an IP generator, or similar machine-readable medium storing this information.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Figure 3:
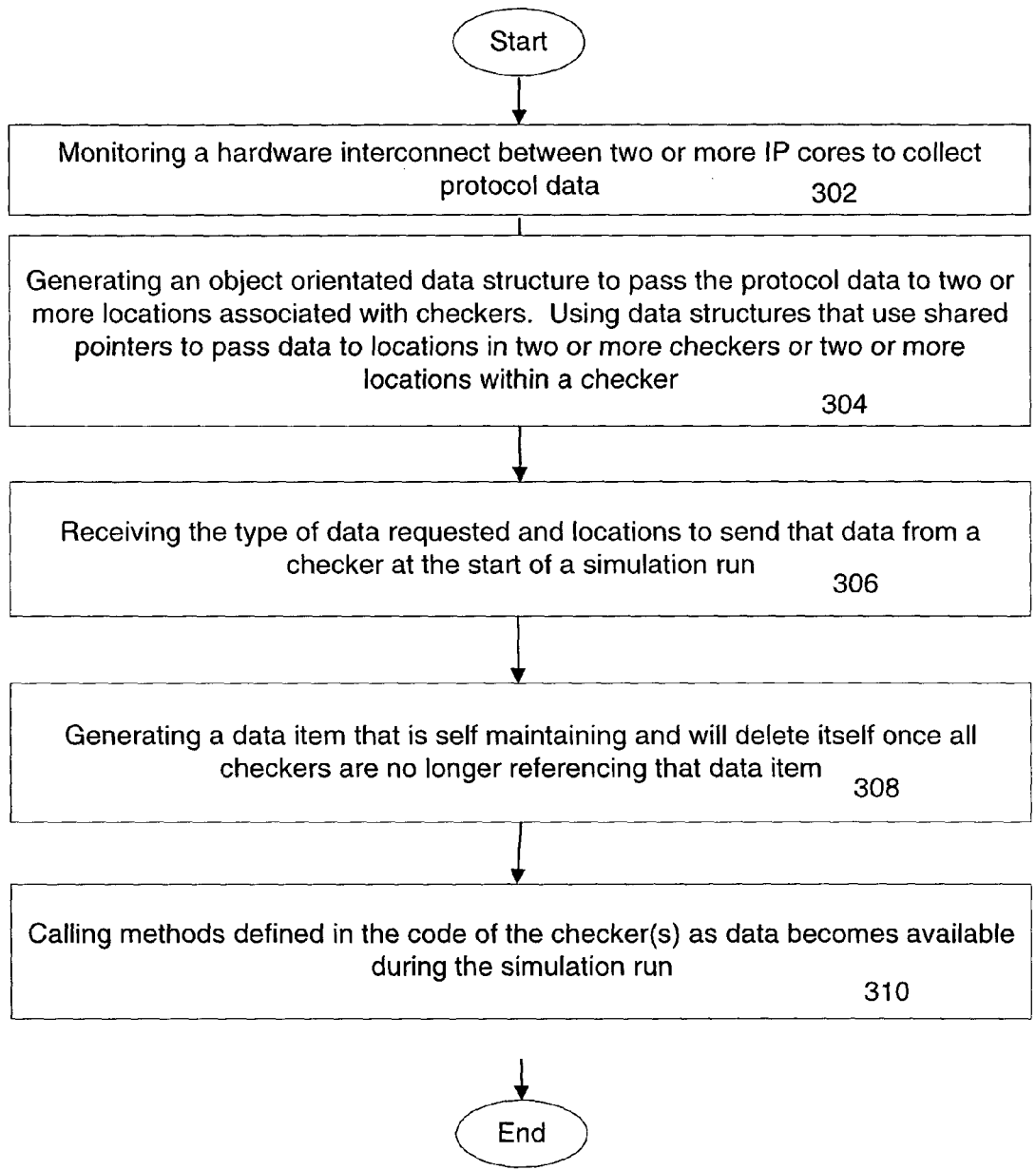
FIG. 3 illustrates a flow diagram of an embodiment of the programming interface connecting one or more protocol checker components and one or more functional checker component for IP cores to a monitor component to debug and verify an IP core design.

FIG. 3 illustrates a flow diagram of an embodiment of the programming interface connecting one or more protocol checker components and one or more functional checker component for IP cores to a monitor component to debug and verify an IP core design.

In block 302, a monitor component monitors a hardware interconnect between two or more IP cores to collect protocol data.

In block 304, the monitor component generates one or more object oriented data structures to pass the protocol data to two or more locations associated with checker components. The monitor component may implement data structures that use shared pointers to pass data to the locations in two or more checker components or two or more locations within a single checker component. For example, two instances of the checker component may be created to send a particular data type to two different locations in the single checker component. Each checker instance sends that particular data type to a separate location. Also, one data item may go to two or more locations and each location is within a different checker component.

In block 306, the monitor component receives the type of data requested and locations to send that data from a checker component at the start of a simulation run. Checker components may also register and unregister during the simulation run as well.

In block 308, the monitor component generates a data item that is self maintaining and will delete itself once all checker components are no longer referencing that data item.

In block 310, the monitor component calls methods defined in the code of the checker components as data becomes available during the simulation run. Thus, the monitor component is programmed to collect data from hardware interconnect and to make the data available to one or more checker components which detect errors in an IP core design and communicate those errors to a user during a simulation run.

While some specific embodiments of the invention have been shown the invention is not to be limited to these embodiments. For example, one skilled in the art will recognize that all types of objects can use the protocol data from the monitor component and request data from the monitor component for other kinds of applications rather than just checking. For example, a disassembler can be constructed that needs the some of the protocol data. Two or more functional checker components may interface the same monitor with or without a protocol checker component interfacing that monitor. The invention is to be understood as not limited by the specific embodiments described herein, but only by the scope of the claims.

The invention claimed is:

1. An apparatus, comprising:
a computer readable medium storing code for a functional checker component for an Intellectual Property (IP) core, a protocol checker component, an interconnect monitor component, and a programming interface,
wherein the code, which when executed by a computing device, to cause the programming interface to connect the functional checker component and the protocol checker component to the interconnect monitor component, wherein the interconnect monitor component having code to build data structures containing protocol data types requested by a first checker component and code specifying where to deliver data based upon a particular type of data requested by the first checker component.

2. The apparatus of claim 1, wherein code of the first checker component is the functional checker component for an IP core.

3. The apparatus of claim 1, wherein code of the first checker component is the protocol checker component.

4. The apparatus of claim 1, wherein the first checker component at the start of a simulation run directs the monitor component on the type of data requested and the locations to send that data in order to verify a hardware interconnect.

5. The apparatus of claim 1, wherein the programming interface is coded in an object-oriented programming language.

6. The apparatus of claim 5, wherein the programming interface is coded in C++.

7. The apparatus of claim 1, wherein the monitor component to create data structures that use shared pointers to pass data from a single monitor component to two or more checker components.

8. The apparatus of claim 1, wherein the monitor component contains a C++ template abstraction sensitive to a particular data type-being requested by the first checker component when the first checker component registers a data callback service with the monitor component.

9. The apparatus of claim 8, wherein a particular data from the monitor component is available for analysis during a simulation run.

10. The apparatus of claim 1, wherein the code for the monitor component is separate from the code for the first checker component receiving data from the monitor component.

11. The apparatus of claim 1, wherein instances of the protocol data type are self maintaining via a reference counted object.

12. A machine-readable medium having data stored thereon, which when manipulated by a machine in response to executable instructions to generate a representation of the apparatus of claim 1.

13. The apparatus of claim 1, wherein the IP cores are components of a System on a Chip.

14. An apparatus, comprising:
a software programming interface to connect one or more functional checker components for an IP core and one or more protocol checker components to one or more interconnect monitor components, wherein the one or more interconnect monitor components have code to create protocol data objects that track within themselves whether their data is still being used by another checker component and when their protocol data object should be deleted; and a computer readable medium to store the software programming interface.

15. The apparatus of claim 14, wherein a first interconnect monitor component to call a method defined in code of a first checker component as data becomes available during a simulation run to allow an error to be detected during the simulation run.

16. The apparatus of claim 14, wherein the code for the first interconnect monitor component is separate from code for a first checker component receiving data from the first interconnect monitor component.

17. The apparatus of claim 14, further comprising two or more checker components to verify an interconnect protocol, wherein the first interconnect monitor component to supply protocol data to the two or more checker components to verify an interconnect protocol.

18. The apparatus of claim 14, wherein the first interconnect monitor component contains data structures that use shared pointers to pass a single item of data from the first interconnect monitor component to two or more locations within a single checker component.

19. The apparatus of claim 14, wherein the first interconnect monitor component contains a C++ template abstraction sensitive to the particular data type being requested by a first checker component when the first checker component registers a data callback service with the first interconnect monitor component.

20. The apparatus of claim 14, wherein a base class of the software programming interface allows implementation across two or more types of interconnect protocols.

21. The apparatus of claim 14, wherein the IP cores are components of a System on a Chip.

22. The apparatus of claim 14, wherein the first interconnect monitor component to supply callback services that deliver data requested by a checker component to one or more locations in the checker component based upon the particular data type requested by the checker component.

23. The apparatus of claim 14, wherein the another checker component is a functional checker component for an IP core.

24. The apparatus of claim 14, wherein the another checker component is a protocol checker.

25. The apparatus of claim 14, wherein a checker component at the start of a simulation run directs the first interconnect monitor component on the type of data requested and the locations to send that data in order to verify a hardware interconnect.

26. The apparatus of claim 14, wherein the software programming interface is coded in an object-oriented programming language.

27. The apparatus of claim 14, wherein a first interconnect monitor component is programmed to collect data from hardware interconnect and to make the data available to a checker component to detect errors in an IP core design and communicate those errors to a user during a simulation run.

28. The apparatus of claim 14, further comprising:

a plurality of checker components, wherein at least one checker component models the functionality of an IP core using the data from the first interconnect monitor component as input.

29. The apparatus of claim 14, wherein the software programming interface includes a set of base classes for the data structures and monitor component callback services.

30. The apparatus of claim 14, wherein a first functional checker component is used to detect errors in an IP core design and communicate those errors to a user during a simulation run.

31. The apparatus of claim 14, further comprising:

a protocol checker generation component to loop through all hardware interconnects in a design and to create an instance of an appropriate protocol checker for that interconnection.

32. The apparatus of claim 14, wherein a first monitor component to generate data structures as needed to supply data to a first checker component and a sum total of requests for data by the first checker component to a monitor component is not a maximal set of data provided by the first monitor component.

33. A machine-readable medium having data stored thereon, which when manipulated by a machine in response to executable instructions to generate a representation of the apparatus of claim 14.

34. A method, comprising:

monitoring a hardware interconnect between two or more IP cores to collect protocol data;

generating an object oriented data structure to pass protocol data to two or more locations associated with checker components;

receiving a type of data requested and a location to send that data from the checker at the start of a simulation run;

calling methods defined in code of the checker components as data becomes available during the simulation run.

35. The method of claim 34, further comprising:

providing callback services to the checker component at registration.

36. The method of claim 34, further comprising:

generating a data item that is self maintaining and will delete itself once all checker components are no longer referencing that data item.

37. A method, comprising:

monitoring a hardware interconnect between two or more IP cores to collect protocol data;

generating one or more object oriented data structures that use shared pointers to pass protocol data to two or more locations associated with checker components; and calling methods defined in code of the checker components as data becomes available during the simulation run.

38. The method of claim 37, further comprising:

using data structures that use shared pointers to pass data to two or more locations within a checker component.

39. An apparatus, comprising:

means for monitoring a hardware interconnect between two or more IP cores to collect protocol data;

means for generating an object oriented data structure to pass protocol data to two or more locations associated with checker components;

means for calling methods defined in code of the checker components as data becomes available during a simulation run; and means for receiving a type of data requested and a location to send that data from the checker anytime during the simulation run.

40. The apparatus of claim 39, further comprising:
means for providing callback services to the checker component at registration.

41. The apparatus of claim 39, further comprising:
means for generating a data item that is self maintaining and will delete itself once all checker components are no longer referencing that data item.

42. The apparatus of claim 39, further comprising:
means for using data structures that use shared pointers to pass data to locations in two or more checker components.

43. A machine-readable medium that provides instructions, which when executed by a machine, cause the machine to perform operations comprising:
collecting protocol data by monitoring an interconnect with an interconnect monitor component; and
connecting, via a programming interface, one or more functional checker components for an IP core and one or more protocol checker components to the interconnect monitor component, wherein the interconnect monitor component has code to build data structures containing protocol data types requested by a first checker component and code on where to deliver data based upon a particular type of data requested by the first checker component.

44. The machine-readable medium of claim 43, further comprising instructions which, when executed by the machine, cause the machine to perform the further operations comprising:
generating an object oriented data structure to pass the protocol data to two or more locations associated with checker components.

45. The machine-readable medium of claim 43, further comprising instructions which, when executed by the machine, cause the machine to perform the further operations comprising:
generating a data item that is self maintaining and will delete itself once all checkers are no longer referencing that data item.

* * * * *